United States Patent [19]

Bragdon et al.

[11] 3,852,344

[45] Dec. 3, 1974

[54] PROCESS FOR RECOVERING IMINODIACETIC ACID FROM SODIUM CHLORIDE SOLUTIONS

[75] Inventors: Robert W. Bragdon, Marblehead, Mass.; Jon C. Thunberg, Amherst; William P. Moore, Durham, both of N.H.

[73] Assignee: W. R. Grace & Co., New York, N.Y.

[22] Filed: Nov. 15, 1973

[21] Appl. No.: 416,027

Related U.S. Application Data

[63] Continuation-in-part of Ser. No. 319,539, Dec. 29, 1972, Pat. No. 3,808,269.

[52] U.S. Cl. ............................................. 260/534 E
[51] Int. Cl. ............................................. C07c 99/12
[58] Field of Search ................................. 260/534 E

[56] References Cited
UNITED STATES PATENTS 3,433,832   3/1969   Swanson et al. ................. 260/534 S

*Primary Examiner*—Vivian Garner
*Attorney, Agent, or Firm*—Elton Fisher; Kenneth E. Prince

[57] ABSTRACT

Iminodiacetic acid can be recovered from a starting aqueous solution of iminodiacetic acid and sodium chloride containing at least about 5 percent iminodiacetic acid by; (a) adjusting the pH of the starting solution to 1.4–3.0 to form an iminodiacetic acid precipitate and a first mother liquor; (b) separating the iminodiacetic acid precipitate from the first mother liquor; and (c) recovering the separated iminodiacetic acid. Sodium chloride can be precipitated from the first mother liquor by evaporating water therefrom to form precipitated sodium chloride and a second mother liquor rich in iminodiacetic acid which can be admixed with a second lot of the starting aqueous solution and processed therewith.

24 Claims, No Drawings

PROCESS FOR RECOVERING IMINODIACETIC ACID FROM SODIUM CHLORIDE SOLUTIONS

CROSS REFERENCE TO RELATED APPLICATIONS

This is a continuation-in-part of copending application Ser. No. 319,539, filed Dec. 29, 1972, and now U.S. Pat. No. 3,808,269.

BACKGROUND OF THE INVENTION

This invention is in the field of iminodiacetic acid (IDA). More specifically this invention is directed to a process for preparing pure or substantially pure IDA.

IDA can be prepared by a route originated by Eschweiler (Ann. 1894, 278, 299–239) wherein iminodiacetonitrile (IDAN) is formed by the reaction of hexamethylenetetraamine (HMTA) and HCN in an aqueous medium. The IDAN is saponified by reaction with aqueous barium hydroxide to yield the barium salt of IDA which is converted to free IDA and barium sulfate by reaction with sulfuric acid. The IDA is separated from the by-product barium sulfate and recovered. This particular process has been unsatisfactory because of low yields, the time required to complete the preparation, the relatively low quality of the IDA produced, the toxicity of soluble barium compounds, and the inconvenience and expense of using barium hydroxide.

Improved process for preparing IDAN are taught by U.S. Pat. No. 3,167,580 (Saunders et al., 260/465.5) and U.S. Pat. No. 3,412,137 (Stutts, 260/365.5). Saunders et al. replaced the HMTA of Eschweiler with acid stabilized aqueous formaldehyde and ammonia while Stutts used Eschweiler's reactants (HMTA and HCN) in aqueous acetic acid.

It is desirable to replace Eschweiler's barium hydroxide with sodium hydroxide because the latter is cheaper, has a lower equivalent weight, is more soluble, is easier to handle under plant conditions, and sodium ions, unlike barium ions, are not toxic.

It is also desirable in some instances to replace Eschweiler's sulfuric acid with hydrochloric acid. Unfortunately, such substitutions introduce complications into the separation and recovery of the IDA product because, unlike Eschweiler's insoluble barium sulfate by-product, sodium chloride (the by-product obtained where Eschweiler's; (a) barium hydroxide is replaced with sodium hydroxide; and (b) sulfuric acid is replaced with hydrochloric acid) is readily soluble, thereby to render the separation and recovery of pure or substantially pure IDA difficult.

U.S. Pat. No. 3,433,832 (Swanson et al., 260/534) teaches a method for separating certain α-amino acids from aqueous solutions containing the free amino acid and sodium chloride.

The Swanson et al method is not applicable to amino acids such as iminodiacetic acid which have a solubility greater than 35.0 parts per 100 parts of water at 100°C.

SUMMARY OF THE INVENTION

In summary, this invention is directed to a process for recovering iminodiacetic acid from an aqueous solution consisting essentially of water, iminodiacetic acid, and sodium chloride, the mole ratio of iminodiacetic acid to sodium chloride being 1:1.0–15.0, said solution having a temperature of 0°–50°C and containing at least about 5 percent iminodiacetic, said process comprising adjusting the pH of said aqueous solution to 1.4–3.0 to precipitate iminodiacetic acid therefrom; separating the precipitated iminodiacetic acid; and recovering the separated iminodiacetic acid.

DESCRIPTION OF PREFERRED EMBODIMENTS

In preferred embodiments of the process recited in the above Summary:
1. The pH is adjusted to 1.8–2.0 or to 1.5–2.2.
2. The mole ratio of iminodiacetic acid to sodium chloride in the aqueous solution is 1:2.0–5.0.

In a preferred embodiment ("Embodiment A") this invention is directed to a process for recovering iminodiacetic acid from a starting solution consisting essentially of water, iminodiacetic acid and sodium chloride, said starting solution having a temperature of about 10°–30°C, said solution analyzing (containing) at least about 5 percent iminodiacetic acid, said process comprising;

a. forming a first slurry consisting essentially of a first crop of precipitated iminodiacetic acid and a first mother liquor by adjusting the pH of the starting solution to 1.8–2.0;

b. separating the first crop of precipitated iminodiacetic acid from the first mother liquor and recovering the separated iminodiacetic acid;

c. forming a second slurry having a temperature effective for preventing the precipitation of iminodiacetic acid therefrom (e.g., at least 80°C) and consisting essentially of precipitated sodium chloride and a second mother liquor analyzing at least about 5 percent dissolved iminodiacetic by evaporating water from the first mother liquor (preferably at 80°–120°C);

d. separating the precipitated sodium chloride from the second mother liquor while maintaining the second slurry and the second mother liquor at a temperature effective for preventing iminodiacetic acid from precipitating therefrom (i.e., at a temperature effective for retaining the iminodiacetic acid in solution (dissolved) in the second mother liquor);

e. forming a third slurry consisting essentially of a second crop of precipitated iminodiacetic acid and a third mother liquor by cooling the second mother liquor to 10°–30°C; and f. separating the second crop of precipitated iminodiacetic acid from the third mother liquor and recovering the separated iminodiacetic acid. In especially preferred embodiments of the process of Embodiment A, supra;

1. The starting solution analyzes 7–26 percent or 18–24 percent iminodiacetic acid.

2. The mole ratio of iminodiacetic acid to sodium chloride in the starting solution is 1:1.8–2.5.

3. The pH of the starting solution is adjusted to 1.8–2.0 or 1.5–2.2.

4. The third mother liquor is combined with separated first mother liquor from a subsequent run.

5. About 80–95 percent of the third mother liquor is combined with separated first mother liquor from a subsequent run.

6. The starting solution consisting essentially of water, iminodiacetic acid, and sodium chloride is prepared by reacting an aqueous disodium iminodiacetate solution with an amount of hydrochloric acid effective to convert the disodium iminodiacetate to iminodiacetic acid.

In a preferred embodiment ("Embodiment B") this invention is directed to a process for recovering iminodiacetic acid from a starting solution consisting essentially of water, iminodiacetic acid and sodium chloride, said starting solution having a temperature of 10°–30°C, said starting solution analyzing (containing) at least about 4.5–6 percent (preferably 18–24 percent) iminodiacetic acid, said process comprising;

a. forming a first slurry consisting essentially of a first crop of precipitated iminodiacetic acid and a first mother liquor by cooling said starting solution to 10°–30°C and adjusting the pH thereof to 1.8–2.0 (the pH adjustment can be made before or after cooling).

b. separating the first crop of precipitated iminodiacetic acid from the first mother liquor and recovering the separated iminodiacetic acid;

c. forming a second slurry consisting essentially of precipitated sodium chloride and a second mother liquor consisting essentially of water with sodium chloride and iminodiacetic acid dissolved therein, the second mother liquor analyzing (containing) at least about 4.5–6 percent dissolved iminodiacetic acid, by evaporating water from the first mother liquor (e.g., at 80°–120°C);

d. separating the precipitated sodium chloride from the second mother liquor while maintaining the second slurry and the second mother liquor at a temperature effective to prevent iminodiacetic acid from precipitating therefrom;

e. forming a third slurry consisting essentially of a second crop of precipitated iminodiacetic acid and a third mother liquor by cooling the second mother liquor to about 10°–30°C; and f. separating the second crop of precipitated iminodiacetic acid from the third mother liquor and recovering the separated iminodiacetic acid.

In especially preferred embodiments of the invention of Embodiment B, supra;

1. The mole ratio of iminodiacetic acid to sodium chloride in the starting solution is 1:2.0–2.4.

2. The pH of the starting solution is adjusted to 1.8–2.0.

In a especially preferred embodiment of this invention as recited in Embodiment A and Embodiment B, both supra, the dissolved IDA content of the second slurry is adjusted to 8–15 percent or 8–13 percent by evaporating water from the first mother liquor (i.e., by boiling said mother liquor) before separating precipitated sodium chloride therefrom. This boiling can be done at atmospheric pressure, or about atmospheric pressure (e.g., about 760 mm of mercury absolute) under reduced pressure (e.g., 100–700 mm of mercury absolute), or under elevated pressure (e.g., 1.5–3 or 4 atmospheres absolute). However, no particular advantage is gained by using reduced or elevated pressure.

In other preferred embodiments of the process of this invention as recited in Embodiments A or B, the first slurry can be formed by cooling the starting solution to 0°–40°C or 10°–30°C and adjusting the pH to 1.4–3.0 or 1.8–2.0. The cooling can be done before or after adjusting the pH or while adjusting the pH. These embodiments can also be used with Embodiment C, infra (the first solution of Embodiment C corresponding to the starting solution of Embodiment A and B, supra).

In another preferred embodiment ("Embodiment C") this invention is directed to a process for recovering iminodiacetic acid from a first solution consisting essentially of water, iminodiacetic acid, and sodium chloride, said solution having a temperature of 10°–30°C and analyzing at least 5 percent iminodiacetic acid, said process comprising;

a. forming a first slurry consisting essentially of precipitated iminodiacetic acid and a first mother liquor by adjusting the pH of a first portion of the first solution to 1.8–2.0;

b. separating the precipitated iminodiacetic acid from the first mother liquor and recovering the separated iminodiacetic acid;

c. forming a second slurry consisting essentially of precipitated sodium chloride and a second mother liquor analyzing at least 5 percent dissolved iminodiacetic acid by evaporating water from the first mother liquor;

d. separating the precipitated sodium chloride from the second mother liquor while maintaining the second slurry and the second mother liquor at a temperature effective for preventing iminodiacetic acid from precipitating therefrom;

e. forming a second solution by admixing at least a portion of the second mother liquor with a second portion of the first solution;

f. forming a third slurry consisting essentially of precipitated iminodiacetic acid and a third mother liquor by adjusting the pH of the second solution to 1.8–2.0;

g. separating the precipitated iminodiacetic acid from the third mother liquor and recovering the separated iminodiacetic acid;

h. forming a fourth slurry consisting essentially of precipitated sodium chloride and a fourth mother liquor analyzing at least 5 percent of dissolved iminodiacetic acid by evaporating water from the first mother liquor; and i. separating the precipitated sodium chloride from the fourth mother liquor while maintaining the fourth slurry and the separated fourth mother liquor at a temperature effective for preventing iminodiacetic acid from precipitating therefrom.

Because of our disclosure it will be readily apparent to those skilled in the art that at least a portion of the fourth mother liquor can be combined with a third lot of the first solution to form a third solution which can be processed to recover IDA therefrom (according to the general procedure used to recover IDA from the second solution) and to form a fifth mother liquor (corresponding to the third mother liquor) which can be processed (according to the general procedure used to process the third mother liquor) to form a sixth mother liquor (corresponding to the fourth mother liquor). Because of our disclosure it will also be readily apparent to those skilled in the art that at least a portion of the sixth mother liquor can be admixed with a fourth portion of the first solution to form a fourth solution which can be processed as above and that this general procedure can be repeated through an indefinite number of runs or "cycles," thereby to prevent waste of IDA product.

In especially preferred embodiments of the invention of Embodiment C, supra:

1. The starting solution consisting essentially of water, iminodiacetic acid, and sodium chloride is prepared by reacting an aqueous disodium iminodiacetate solution with an amount of hydrochloric acid effective to convert the disodium iminodiacetate to iminodiacetic acid.
2. The pH of the first solution is adjusted to 1.5–2.1 or 1.8–2.0.
3. The pH of the second solution is adjusted to 1.5–2.1 or 1.8–2.0.
4. The mole ratio of iminodiacetic acid to sodium chloride in the first solution is 1.0:2.0–2.4.
5. The iminodiacetic acid concentration of the first solution is 18–24.
6. About 80–95 percent of the second mother liquor is admixed with a second lot of the first solution to form the second solution.

DETAILED DESCRIPTION OF THE INVENTION

We can prepare IDA from IDAN by the following sequence of reactions:

We can prepare IDA from IDAN by the following sequence of reactions:

1. Saponification step:

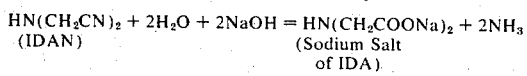

2. Acidification step:

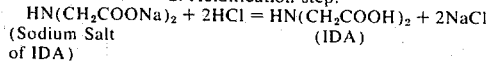

Because of our disclosure it will be readily apparent to those skilled in the art that where preparing IDA from IDANa$_2$ which was prepared by the hydrolysis of IDAN with aqueous NaOH solution, the above-mentioned acidification step and the pH adjusting step (e.g., the pH adjusting steps of subparagraph (a) of Embodiments A, B, or C, supra) can be combined. If desired the acidification/pH adjustment step can be preceded by or followed by a cooling step if cooling is required to precipitate IDA.

Because of our disclosure it will be readily apparent that, where; (a) crystallizing or precipitating IDA from an aqueous solution consisting essentially of water, IDA, and sodium chloride by adjusting the pH to a pH within the range of 1.4–3; and (b) separating the crystallized IDA, the temperature of such system must be maintained at a temperature effective for precipitating (or crystallizing) and not dissolving the IDA. Where IDA concentration is within the range of about 4.5–6 percent such temperature is about 0°–30°C. Where the IDA concentration is greater (e.g., 8–9 percent, 9–13 percent or 10–20 percent, or higher) a higher temperature can be used. However, in general, the lower the temperature (down to about 10°C or slightly lower) the higher the one pass recovery of IDA at any preselected pH within the range of about 1.4–3.

Where an excess of sodium hydroxide is added in the saponification step sufficient hydrochloric acid is added in the acidification step to neutralize such excess (free) sodium hydroxide according to the following equation:

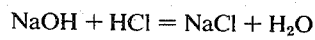

As noted supra, the pH can be adjusted during (or after the acidification step) to the level used in the separation of IDA, namely a pH within the range of pH 1.4–3 (or one of the other preferred pH ranges recited supra).

If too much hydrochloric acid is added during the acidification step or where adjusting the pH, the pH can be increased by neutralizing the excess acid with sodium hydroxide or IDANa$_2$.

Where precipitating IDA by adjusting the pH and cooling (where cooling is required to precipitate IDA) it is generally preferred to adjust the temperature by cooling the solution consisting essentially of water, IDA and sodium chloride and then adjusting the pH; however, excellent results have been obtained where; (a) adjusting the pH before cooling; or (b) adjusting the pH during cooling.

The solution from which IDA is crystallized (precipitated) in the process of this invention (i.e., a solution consisting essentially of water with IDA and sodium chloride dissolved therein such as the solution recited in the above Summary, the solution recited in step (a) of Embodiment A and Embodiment B (both supra) and the second mother liquor recited in steps (e) of said Embodiment A and said Embodiment B) should preferably contain at least about 5 percent IDA, but this value (5 percent) is not critical, and excellent results have been obtained with solutions having a somewhat lower IDA content including 4.5 percent, and 4.8 percent IDA. Economic considerations generally favor the use of concentrations somewhat or considerably greater than 5 percent; e.g., excellent results have been obtained with such solutions containing 8 percent, 10 percent, 12 percent, 15 percent, 20 percent and more IDA dissolved therein.

If the solution from which the IDA is to be recovered in the process of the above summary and the embodiments depending therefrom, or the process of Embodiments A, or B, or C and the embodiments depending therefrom analyzes less than about 5 percent IDA (i.e., less than about 5 g of IDA per 100 g of solution) said solution can be concentrated by evaporating water therefrom. Such evaporation can be conducted at the normal boiling point or under reduced or elevated pressure until the IDA concentration has been adjusted to the desired level. Where evaporating water from such solution care is used to aviod evaporating so much water that both IDA and sodium chloride precipitate together. This can be readily avoided because, when sodium chloride precipitates it can be separated from the solution by centrifuging, or filtering, or decanting while the solution is at a temperature between about 80° and 120°C at which temperature IDA will remain in solution unless an excessive amount of water has been evaporated.

Of course, if the solution were evaporated too far and the concentration of the IDA became too high, IDA would precipitate out at an elevated temperature. However, by noting the solubility of IDA as a function of temperature, one skilled in the art can, because of this disclosure, readily avoid conditions under which IDA precipitates at elevated temperatures. For example the solubility of IDA in water is about 4 g per 100 g of water at 25°C and 53 g per 100 g of water at 100°C.

It is generally preferred to have the IDA concentration of the starting solution from which IDA is precipitated and recovered beween 5 g and 24 g (or between 15 and 24 g) per 100 g of solution, but excellent results have been obtained where using solutions containing up to 30 g of IDA per 100 g of solution. The IDA concentration is not critical; however, in general, the higher the IDA concentration the greater the percent IDA recovery per pass. Because of our disclosure it will be readily apparent to those skilled in the art that in the procedure of our invention as recited in the above Summary, in the embodiments thereunder, in the above Embodiment A and the embodiments thereunder, and in the above Embodiment C and the embodiments thereunder, IDA will not precipitate on adjusting the pH of an aqueous solution consisting essentially of water, IDA, and sodium chloride if the temperature of such solution (after adjusting its pH) is such that the concentration of the IDA dissolved in said solution does not exceed the solubility of IDA at such temperature. Because of our disclosure it will be readily apparent to those skilled in the art that, in such event, lowering the temperature of such solution to a temperature effective for precipitating IDA therefrom will cause a crop of IDA crystals to precipitate therefrom. By a temperature effective for precipitating IDA is meant a temperature sufficiently low to cause dissolved IDA to precipitate. Because of our disclosure, it will be readily apparent to those skilled in the art that the temperature can be reduced before or after adjusting the pH providing the lower temperature is maintained after the pH is lowered to avoid redissolving precipitated IDA before it is separated from the mother liquor.

It is, as noted supra, generally preferred to adjust the pH of the solution from which the IDA is to be recovered to 1.8–2.0 (if pH adjustment is required) after cooling it (the solution) preferably to 10°–30°C, but excellent results have been obtained where adjusting the pH where the temperature of said solution was 30°–70°C or higher or somewhat lower.

To lower the pH it is preferred to add hydrochloric acid, and to increase the pH it is preferred to add aqueous sodium hydroxide solution or IDANa$_2$. However, techniques for adjusting the pH are well known to those skilled in the art. The pH (or pH range) used is important but the exact technique used to reach a specific pH (or a specific pH range) is unimportant or of relatively little importance in the process of this invention. For example final adjustment of pH could be done with potassium hydroxide or IDAK$_2$ (to raise the pH).

Various modifications of the above recited embodiments which are fully equivalent to the process as recited in Embodiment A or the embodiments thereunder or as recited in Embodiment B or the embodiments thereunder will, because of this disclosure, by readily apparent to those skilled in the art. Such fully equivalent modifications include but are not limited to:

1. The modification (where making a series of batch runs using the process of this invention as set forth in; (a) Embodiment A or the embodiments thereunder; or (b) Embodiment B or the embodiments thereunder) in which the second mother liquor (from which the sodium chloride has been precipitated (crystallized) and separated) is sent to and combined with the starting solution consisting essentially of water, IDA, and sodium chloride (from a subsequent run) from which IDA is to be precipitated in step (a) of such subsequent run.

2. The modification in which second mother liquors from a plurality of runs are combined and then; (a) sent to and combined with the aforesaid starting solution from which IDA will be precipitated in step (a) of a subsequent run; or (b) cooled to about 10°–30°C and processed according to the procedure recited in steps (b) through (f) of said Embodiment A or B (or an embodiment thereunder).

3. The modification (where making a continuous run using the general process of this invention as recited in Embodiment A or B (or an embodiment thereunder)) in which the second mother liquor is recycled to step (a) of said Embodiment A or B of such continuous run.

4. The process of this invention as set forth in Embodiment A (or an embodiment thereunder) or Embodiment B (or an embodiment thereunder) to make a series of batch runs in which the third mother liquor (from which IDA has been precipitated and separated) is sent to and combined with the first mother liquor of a subsequent run (from which IDA has been precipitated and separated) for precipitation of sodium chloride in step (c) of Embodiment A or B (or an embodiment thereunder) of said subsequent run.

Alternatively, third mother liquor from a plurality of batch runs can be combined with such first mother liquor from which IDA has been precipitated and separated.

5. The modification in a continuous run in which the third mother liquor (from which IDA has been precipitated and separated) is recycled to step (c) of the process recited in Embodiment A or B (or an embodiment thereunder).

Where using any of the six (6) above-recited modifications of the process of Embodiment A or B (or any of the embodiments thereunder) it is preferable to set aside (or discard) a portion (e.g., 2 percent, or 3 percent, or 4–5 percent, or 5–10 percent, or 10–20 percent) of the material to be sent to and combined with material in a subsequent batch run or recycled in a continuous run. This prevents the build up of undesirable side products which can (under proper circumstances) include nitrilotriacetic acid (NTA) and/or color bodies in the system. The material set aside can be processed in a separate run when sufficient material has accumulated thereby recovering substantially all of the IDA therefrom as crude (somewhat impure) IDA which can be further purified (e.g., by recrystallization from water or acidified water having a pH of 2.0–2.5 (preferably 2.1–2.3)).

IDA separated by the process of this invention can, if desired be washed, for example with cool or cold water (e.g., water having the temperature of about 5°–25°C or 30°C) or, alternatively with a solution of IDA (e.g., a saturated or nearly saturated aqueous solution of IDA).

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

A slurry consisting essentially of 4,650 lbs. of crystalline IDAN and 250 gals. (2,084 lbs.) of water was prepared by thoroughly admixing the IDAN and the water. The water had a temperature of 25°C.

A sodium hydroxide solution was prepared in a 4,000 gal. saponification reactor equipped with a turbine stirrer, heat exchange coils, and an 8 inch vapor vent connected to an ammonia scrubber by admixing therein 8,220 lbs. of a 50 percent sodium hydroxide (caustic soda) solution and 1,500 gals. of water.

The above-described aqueous IDAN slurry was added to the caustic soda solution by pumping the slurry into the caustic solution at an even rate over a period of 3 hours while stirring the resuulting mixture. The mixture in the saponification reactor was then brought to a rolling boil and boiled at atmospheric pressure for about 1 hour vaporizing ammonia and water therefrom. The resulting solution (an aqueous solution of the sodium salt of iminodiacetic acid (IDA-$Na_2$)) weighed 25,170 lbs. and analyzed 33 percent $IDANa_2$. Said solution was cooled to 80°C and 36 lbs. to 35 percent hydrogen peroxide was added to bleach the $IDANa_2$ solution (i.e., to oxidize color bodies therein). A portion of the bleached solution was evaporated to dryness and the residue was found to contain about 1 percent trisodium nitrilotriacetate ($NTANa_3$).

To the above described $IDANa_2$ solution was added 6,000 pounds of 20° B. (ca 31.5 percent) hydrochloric acid solution. The resulting solution, which had a pH of about 5, was boiled until about 7300 pounds of water had been removed. This solution was then cooled to about 50°C. 5,800 pounds of hydrochloric acid was added while passing cooling water through the heat exchange coils. 1 pound of IDA crystals from a previous batch was added as seed and the thus seeded material (which was designated "Slurry A") was cooled to 20°–25°C. The pH was then adjusted to 1.8–2.0 with hydrochloric acid and the resulting slurry was maintained at 20°–25°C for two hours while stirring said slurry (which was designated "Slurry A"). Said Slurry A was centrifuged to separate the crystals of IDA from the mother liquor which was designated "Separated Mother Liquor A." The separated crystals of IDA were washed with 16 gals. of water at about 25°C, and dried in a rotary kiln using hot air with a maximum outlet temperature 110°C. The dried IDA crystals weighed 4,450 lbs. representing a conversion (1 pass yield) of 71 percent based on the $IDANa_2$. The IDA crystals assayed over 99 percent IDA and contained 0.2 percent nitrilotriacetic acid (NTA), 0.1 percent ash, and 0.4 percent water.

Separated Mother Liquor A was combined with the water used to wash the IDA crystals free of said mother liquor. The resulting combination of separated mother liquor A and wash water weighed 25,100 lbs. Analyses showed that this material contained 6,008 lbs. of sodium chloride and 1,792 lbs. of IDA; it was designated "Solution A-1" and used in Example 2.

In other runs using the general procedure of this example the procedure was modified by; (a) maintaining the temperature of the above-mentioned cooled mixture at 15°C, 18°C, 22°C, 25°C, 28°C and 30°C while adjusting its pH and while separating the IDA product after precipitating said product; and (b) adjusting the pH to 1.7, 1.8, 1.9, 2.0, 2.2, and 2.4.

In each instance excellent results were obtained.

EXAMPLE 2

Solution A-1 was converted to a slurry consisting essentially of precipitated (crystallized) sodium chloride and a mother liquor consisting essentially of water with IDA and sodium chloride dissolved therein by boiling Solution A-1 to vaporize 14,064 pounds of water therefrom. Said slurry consisted essentially of 1,774 lbs. of IDA, 6,008 lbs. of sodium chloride, and 5,475 lbs. of water. A substantial portion of the sodium chloride crystallized during the boiling (concentration) step. While maintaining the temperature of the thus concentrated mixture at 90°–100°C said mixture was centrifuged to separate the crystalline sodium chloride from the hot mother liquor. The resulting mother liquor (from which the crystalline sodium chloride had been separated) weighed 9,589 lbs. and contained 1,792 lbs. of dissolved IDA, 2,543 lbs. of dissolved sodium chloride, and 5,254 lbs. of water. This mother liquor was designated "Mother Liquor B-2."

In other runs employing the general procedure of this example the procedure was modified by using Solutions A-1 from runs made using the general procedure of Example 1 which had been modified by; (a) maintaining the temperature of the cooled mixture (of Example 1) at 15°C, 18°C, 22°C, 25°C, 28°C, and 30°C while adjusting its pH and while separating the IDA product after precipitating said product; and (b) adjusting said pH to 1.7, 1.8, 1.9, 2.0, 2.2, and 2.4.

In each instance excellent results were obtained.

EXAMPLE 3

Two additional replications of Examples 1 and 2 were run. In each instance the respective results were substantially indistinguishable from those obtained in Examples 1 and 2, respectively.

EXAMPLE 4

Mother Liquor B-2 from Example 2 was combined with the 2 lots of Mother Liquor B-2 from Example 3 and diluted with 5917 lbs of water. The combined diluted mother liquors weighed 34,684 lbs. and contained 4,376 lbs. of IDA, 7,629 lbs. of sodium chloride, and 21,679 lbs. of water. The combined solution (combined diluted mother liquors) was cooled to 50°C and seeded with 1 lb. of IDA crystals suspended in a liter of water. The seeded mixture which had a pH of 2.0 was further cooled to 20°–27°C and held within said temperature range for 2 hours. A substantial quantity of IDA precipitated from the solution as a second crop (the first crop having been obtained in Example 1 and the above-mentioned replications thereof).

The precipitated IDA was separated from the mother liquor by centrifuging. The separated IDA was washed, dried as in Example 1, and weighed. Its weight was 3,590 lbs. The separated mother liquor plus wash water weighed 31,000 lbs. and contained 1,786 lbs. of IDA, 7,629 lbs. of sodium chloride, and 21,585 lbs. of water. Said mother liquor was designated "Mother Liquor C-4."

The separated IDA was indisguishable from the first crop that was obtained in Example 1, supra.

The recovered IDA (3,590 lbs.) obtained in this example amounted to an additional recovery of 1,197 lbs. of IDA per batch (because the IDA recovered in this run (Example 4) was recovered from a conbination of 3 batches). In other words, using the method recited in this Example (Example 4) increased the conversion from 71 to 90 percent.

In other runs the general procedure of this example was modified by combining in each instance three batches of Mother Liquor B-2 which had been prepared from Solutions A-1 which had been prepared by the general procedure of Example 1 which had been modified by; (a) maintaining the temperature of the cooled mixture (of Example 1) at 15°C, 18°C, 22°C, 25°C, 28°C, and 30°C while adjusting its pH and while separating the IDA product after precipitating (crystallizing) said IDA product; and (b) adjusting said pH to 1.7, 1.8, 1.9, 2.0, 2.2, and 2.4. In such runs, the second crop of IDA was precipitated (crystallized) from a mother liquor having a pH of about 1.7, 1.8, 1.9, 2.0, and 2.4, (depending upon the pH of the Solutions A-1 from which the Mother Liquors B-2 were prepared).

In each instance excellent results were obtained.

EXAMPLE 5

The general procedure of Examples 1 and 2 were repeated and the results obtained were indistinguishable from those of said Examples 1 and 2.

EXAMPLE 6

The general procedure of Example 1 was repeated however, in this instance the procedure was modified by adding Mother Liquor B-2 from Example 5 plus 1972 lbs. of water to the Surry A formed in this run (Example 6) before cooling said slurry to 20°-35°C. The results were indistingushable from those of Example 1 except that the recovered IDA weighed 5,645 lbs. (rather than the 4,450 pounds obtained in Example 1).

EXAMPLE 7

The general procedure of Example 2 was repeated; however, in this instance the Solution A-1 which was used was that from Example 6. The results were substantially the same as those obtained in Example 2 except that the quantity of sodium chloride precipitated was somewhat larger than in Example 2 (because of the dissolved sodium chloride present in the Mother Liquor B-2 from Example 5 which was added to the Slurry A of Example 6).

EXAMPLE 8

The general procedure of Example 1 was repeated. However, in this instance 95 percent of the Liquor B-2 from Example 7 was added to the Slurry A formed in this run (Example 8) before cooling said slurry to 20°-35°C. The remaining 5 percent of the Liquor B-2 from Example 7 was discarded to prevent the accumulation of possible excessive quantities of undesirable side products (e.g., NTA and color bodies) in the product IDA. The recovered IDA analyzed 99 percent IDA, 0.2 percent NTA, and 0.5 percent moisture.

EXAMPLE 9

The general procedure of Example 7 was repeated. However, in this run the Solution A-1 which was used was that from Example 8. The results were substantially identical with those obtained in Example 7.

EXAMPLE 10

The general procedure of Example 8 was repeated. However, in this instance 95 percent of the Liquor B-2 from Example 9 was added to the Slurry A formed in this run (Example 10) before separating the precipitated IDA therefrom at 20°-25°C. The remaining 5 percent of the Liquor B-2 from Example 9 was discarded. The results obtained were substantially identical with those obtained in Example 8.

EXAMPLE 11

A series of 8 runs was made as follows:
Run No. 1

A first solution being substantially free of NTA, weighing about 1000 g, having a pH of about 5 and consisting essentially of water, sodium hydrogen iminodiacetate

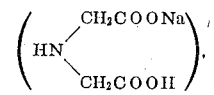

hereinafter "IDAHNa," and sodium chloride, said solution containing IDAHNa equivalent to about 13 percent IDA and having a mole ratio of IDAHNa to sodium chloride of about 1:1.1 was boiled at atmospheric pressure to evaporate water therefrom and to form a second solution weighing 521 g.

The second solution was cooled to 50°C and its pH was adjusted to 1.8-2.0 by adding hydrochloric acid thereto. The resulting solution was seeded with 1 g of IDA and further cooled to 20°-30°C. IDA crystallized therefrom to form a first slurry weighting 521 g and consisting essentially of precipitated IDA and a first mother liquor consisting essentially of water with IDA and sodium chloride dissolved therein. The overall (total) IDA content (dissolved IDA and precipitated IDA) of the first slurry was 21 percent and the mole ratio of total IDA to the sodium chloride of said slurry was 1:2.2.

The first slurry was centrifuged to separate the precipitated IDA from the first mother liquor. The separated IDA was washed with 20 g of cool (25°C) water applied as a fine spray, air dried, recovered, weighed, and analyzed. The recovered IDA weighed 94 g and analyzed 100 percent IDA.

The first mother liquor was combined with the water used to wash the separated IDA to form a combined third solution. The third solution was boiled to evaporate water therefrom and to form a second slurry weighing 272 g and consisting essentially of precipitated (crystallized) sodium chloride and a second mother liquor consisting essentially of water with IDA and sodium chloride dissolved therein.

The second slurry was centrifuged while maintaining its temperature at 90°C to separate the precipitated sodium chloride from the second mother liquor. The separated second mother liquor was set aside for use in Run No. 2, infra.
Run No. 2

The general procedure of Run No. 1 supra was repeated. However, in this instance the procedure was modified by combining the separated second mother liquor from Run No. 1 plus 79 g of water with the second solution of this run (Run No. 2) before cooling said second solution to 20°C.

The air dried IDA product obtained in this run weighed 131 g and analyzed 100 percent IDA.

The separated second mother liquor from this run was set aside for use in Run No. 3.
Run Nos. 3-8

The general procedure of Run No. 2 was repeated. However in each of these runs the procedure was modified by combining the separated mother liquor from the immediately preceding run with the second solution of the run underway before cooling said second solution to 35°C as shown in Table I.

TABLE I

| Run No. | Separated Mother Liquor From Run No. | Second Solution of Run No. |
|---------|--------------------------------------|----------------------------|
| 3 | 2 | 3 |
| 4 | 3 | 4 |
| 5 | 4 | 5 |
| 6 | 5 | 6 |
| 7 | 6 | 7 |
| 8 | 7 | 8 |

Table II shows the quantity and analysis of air dried IDA recovered in Runs 3–8, inclusive.

TABLE II

| Run No. | Weight of Recovered IDA, g | Purity of Recovered IDA, % IDA |
|---------|----------------------------|-------------------------------|
| 3 | 126 | 99 |
| 4 | 135 | 100 |
| 5 | 132 | 98 |
| 6 | 125 | 99 |
| 7 | 129 | 100 |
| 8 | 134 | 99.5 |

The second mother liquor frum Run No. 8 was weighed and analyzed for IDA; it was found to contain 21 g of IDA (reported as pure IDA).

Because of its lower solubility (NTA being less soluble in water than IDA), the presence of NTA in IDA is objectionable.

Iminodiacetic acid is used in metal plating baths. German Pat. No. 1,034,946 (Chem. Abstracts 1960, 54, 16237e) describes the use of IDA in cyanide-containing copper (and copper alloy) plating baths. The presence of IDA in such baths causes copper (or the copper alloy) to plate (precipitate) as a bright coating.

The use of IDA in the preservation of rubber latex is taught by British Patent 800,089 (Chem. Abstracts 1959, 53, 2672i).

As used herein the term "percent(%)" means parts per hundred and parts means parts by weight unless otherwise defined where used.

As used herein the term "mole" has its generally accepted meaning, a mole of a substance is that quantity which contains the same number of molecules of the substance as there are atoms in 12 grams of pure $^{12}C$.

As used herein the term "lb." means pound and the term "lbs." means pounds averdupois. One lb. averdupois is 7000 grains or 453.592 grams.

As used herein the term "g" means gram or grams.

As used herein the term "gal., gals., gallon, or gallons" means US gallon(s). One US gallon is 3.7853 liters.

IDA means iminodiacetic acid.
IDAN means iminodiacetonitrile.
IDANa$_2$ means disodium iminodiacetate.
NTA means nitrilotriacetic acid.
NTANa$_3$ means trisodium nitrilotriacetate.
HMTA means hexamethylenetetramine.
IDAHNa means

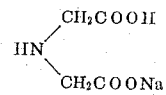

We claim:

1. A process for recovering iminodiacetic acid from an aqueous solution consisting essentially of water, iminodiacetic acid, and sodium chloride, the mole ratio of iminodiacetic acid to sodium chloride being 1:1.0–15.0, said solution having a temperature of about 0°–50°C and containing at least about 5 percent iminodiacetic, said process comprising adjusting the pH of said aqueous solution to 1.4–3.0 to precipitate iminodiacetatic acid therefrom; separating the precipitated iminodiacetic acid; and recovering the separated iminodiacetic acid.

2. The process of claim 1 in which the pH is adjusted tc 1.5–2.2.

3. The process of claim 1 in which the pH is adjusted to 1.8–2.0.

4. The process of claim 1 in which the mole ratio of iminodiacetic acid to sodium chloride in the aqueous solution is 1:2.0–5.0.

5. A process for recovering iminodiacetic acid from a starting solution consisting essentially of water, iminodiacetic acid and sodium chloride, said starting solution having a temperature of about 10°–30°C and analyzing at least about 5 percent iminodiacetic acid, said process comprising;

a. forming a first slurry consisting essentially of a first crop of precipitated iminodiacetic acid and a first mother liquor by adjusting the pH of the starting solution to 1.8–2.0;
 b. separating the first crop of precipitated iminodiacetic acid from the first mother liquor and recovering the separated iminodiacetic acid;
 c. forming a second slurry having a temperature effective for preventing the precipitation of iminodiacetic acid therefrom and consisting essentially of precipitated sodium chloride and a second mother liquor analyzing at least 5 percent dissolved iminodiacetic acid by evaporating water from the first mother liquor;
 d. separating the precipitated sodium chloride from the second mother liquor while maintaining the second slurry and the second mother liquor at a temperature effective for preventing iminodiacetic acid from precipitating therefrom;
 e. forming a third slurry consisting essentially of a second crop of precipitated iminodiacetic acid and a third mother liquor by cooling the second mother liquor to 10°–30°C; and
 f. separating the second crop of precipitated iminodiacetic acid from the third mother liquor and recovering the separated iminodiacetic acid.

6. The process of claim 5 in which the iminodiacetic acid concentration of the starting solution consisting essentially of water, iminodiacetic acid, and sodium chloride is 7–26 percent.

7. The process of claim 5 in which the mole ratio of iminodiacetic acid to sodium chloride in the solution consisting essentially of water, iminodiacetic acid, and sodium chloride is 1:1.8–2.5.

8. The process of claim 5 in which the pH of the starting solution is adjusted to 1.5–2.2.

9. The process of claim 5 in which the pH of the starting solution is adjusted to 1.8–2.0.

10. The process of claim 5 in which the third mother liquor is combined with separated first mother liquor from another run.

11. The process of claim 5 in which 80–95 percent of the third mother liquor is combined with separated first mother liquor from another run.

12. The process of claim 5 in which the starting solution consisting essentially of water, iminodiacetic acid, and sodium chloride is prepared by reacting an aqueous disodium iminodiacetate solution with an amount of hydrochloric acid effective to convert the disodium iminodiacetate to iminodiacetic acid.

13. A process for recovering iminodiacetic acid from a starting solution consisting essentially of water, iminodiacetic acid and sodium chloride, said starting solution having a temperature of about 10°–30°C said starting solution analyzing at least 4.5–6 percent iminodiacetic acid, said process comprising;

a. forming a first slurry consisting essentially of a first crop of precipitated iminodiacetic acid and a first mother liquor by cooling said starting solution to 10°–30°C and adjusting the pH thereof to 1.8–2.0;

b. separating the first crop of precipitated iminodiacetic acid from the first mother liquor and recovering the separated iminodiacetic acid;

c. forming a second slurry consisting essentially of precipitated sodium chloride and a second mother liquor consisting essentially of water with sodium chloride and iminodiacetic acid dissolved therein, the second mother liquor analyzing at least 4.5–6 percent dissolved iminodiacetic acid, by evaporating water from the first mother liquor;

d. separating the precipitated sodium chloride from the second mother liquor while maintaining the second slurry and the second mother liquor at a temperature effective to prevent iminodiacetic acid from precipitating therefrom;

e. forming a third slurry consisting essentially of a second crop of precipitated iminodiacetic acid and a third mother liquor by cooling the second mother liquor to 10°–30°C; and f. separating the second crop of precipitated iminodiacetic acid from the third mother liquor and recovering the separated iminodiacetic acid.

14. The process of claim 13 in which the mole ratio of iminodiacetic acid to sodium chloride in the starting solution consisting essentially of water, iminodiacetic acid, and sodium chloride is 1:2.0–2.4.

15. The process of claim 13 in which the pH is adjusted to 1.8–2.0.

16. A process for recovering iminodiacetic acid from a first solution consisting essentially of water, iminodiacetic acid, and sodium chloride said solution having a temperature of about 10°–30°C and analyzing at least 5 percent iminodiacetic acid, said process comprising;

a. forming a first slurry consisting essentially of precipitated iminodiacetic acid and a first mother liquor by adjusting the pH of a first portion of the first solution to 1.8–2.0;

b. separating the precipitated iminodiacetic acid from the first mother liquor and recovering the separated iminodiacetic acid;

c. forming a second slurry consisting essentially of precipitated sodium chloride and a second mother liquor analyzing at least 5 percent dissolved iminodiacetic by evaporating water from the first mother liquor;

d. separating the precipitated sodium chloride from the second mother liquor while maintaining the second slurry and the second mother liquor at a temperature effective for preventing iminodiacetic acid from precipitating therefrom;

e. forming a second solution by admixing at least a portion of the second mother liquor with a second portion of the first solution;

f. forming a third slurry consisting essentially of precipitated iminodiacetic acid and a third mother liquor by adjusting the pH of the second solution to 1.8–2.0;

g. separating the precipitated iminodiacetic acid from the third mother liquor and recovering the separated iminodiacetic acid;

h. forming a fourth slurry consisting essentially of precipitated sodium chloride and a fourth mother liquor analyzing at least 5 percent of dissolved iminodiacetic by evaporating water from the first mother liquor; and i. separating the precipitated sodium chloride from the fourth mother liquor while maintaining the fourth slurry and the separated fourth mother liquor at a temperature effective for preventing iminodiacetic acid from precipitating therefrom.

17. The process of claim 16 in which the first solution consisting essentially of water, iminodiacetic acid, and sodium chloride is prepared by reacting an aqueous disodium iminodiacetate solution with an amount of hydrochloric acid effective to convert the disodium iminodiacetate to iminodiacetic acid.

18. The process of claim 16 in which the pH of the first solution is adjusted to 1.5–2.1.

19. The process of claim 16 in which the pH of the first solution is adjusted to 1.8–2.0.

20. The process of claim 16 in which the pH of the second solution is adjusted to 1.5–2.2.

21. The process of claim 16 in which the pH of the second solution is adjusted to 1.8–2.0.

22. The process of claim 16 in which the mole ratio of iminodiacetic acid to sodium chloride in the first solution is 1.0:2.0–2.4.

23. The process of claim 16 in which the iminodiacetic acid concentration of the first solution is 18–24 percent.

24. The process of claim 16 in which 80–95 percent of the second mother liquor is admixed with the second portion of the first solution to form the second solution.

* * * * *